United States Patent
Spiers et al.

(10) Patent No.: US 6,839,706 B2
(45) Date of Patent: Jan. 4, 2005

(54) BLOCK DATA STORAGE WITHIN A COMPUTER NETWORK

(75) Inventors: John Spiers, Louisville, CO (US); Kelly Long, Longmont, CO (US); Sebastian Sobolewski, Longmont, CO (US); Donald Kehn, Boulder, CO (US)

(73) Assignee: LeftHand Networks, Inc., Boulder, CO (US)

( * ) Notice: Subject to any disclaimer, the term of this patent is extended or adjusted under 35 U.S.C. 154(b) by 0 days.

(21) Appl. No.: 09/682,209

(22) Filed: Aug. 6, 2001

(65) Prior Publication Data

US 2003/0028731 A1 Feb. 6, 2003

(51) Int. Cl.⁷ .............................................. G06F 13/00
(52) U.S. Cl. ................................. 707/4; 707/1; 707/10; 709/217; 709/216
(58) Field of Search ............................... 709/230, 250, 709/213, 216, 217; 711/100; 707/10, 4, 1, 3

(56) References Cited

U.S. PATENT DOCUMENTS

| | | | | |
|---|---|---|---|---|
| 5,689,698 A | * | 11/1997 | Jones et al. | 707/4 |
| 5,710,908 A | * | 1/1998 | Man | 709/230 |
| 5,754,841 A | * | 5/1998 | Carino, Jr. | 707/3 |
| 5,873,083 A | * | 2/1999 | Jones et al. | 707/4 |
| 5,930,786 A | * | 7/1999 | Carino et al. | 707/4 |
| 5,996,024 A | | 11/1999 | Blumenau | 709/326 |
| 6,052,685 A | * | 4/2000 | Eastwick et al. | 707/10 |
| 6,240,417 B1 | * | 5/2001 | Eastwick et al. | 707/10 |
| 6,470,397 B1 | * | 10/2002 | Shah et al. | 709/250 |
| 6,493,804 B1 | | 12/2002 | Soltis et al. | 711/152 |
| 2003/0217064 A1 | * | 11/2003 | Walters | 707/100 |

\* cited by examiner

*Primary Examiner*—Kenneth R. Coulter
(74) *Attorney, Agent, or Firm*—Holland & Hart LLP; Christopher J. Kulish

(57) ABSTRACT

The present invention provides the ability to transfer data between a initiating computer system and a target computer system with a block data storage device, where the target computer system is remote relative to the initiating computer system, that is interface independent relative to the type of the block data storage device employed. In one embodiment, a virtual device driver is employed that implements a command set that is interface independent relative to the block data storage device.

15 Claims, 16 Drawing Sheets

```
Read
     0                   1                   2                   3
     0 1 2 3 4 5 6 7 8 9 0 1 2 3 4 5 6 7 8 9 0 1 2 3 4 5 6 7 8 9 0 1 2
    +-+-+-+-+-+-+-+-+-+-+-+-+-+-+-+-+-+-+-+-+-+-+-+-+-+-+-+-+-+-+-+-+
    |                         Command=0x10                          |
    +-+-+-+-+-+-+-+-+-+-+-+-+-+-+-+-+-+-+-+-+-+-+-+-+-+-+-+-+-+-+-+-+
    |                        TransactionKey                         |
    +-+-+-+-+-+-+-+-+-+-+-+-+-+-+-+-+-+-+-+-+-+-+-+-+-+-+-+-+-+-+-+-+
    |        ClusterID=0xXX         |         LunID=0xXX            |
    +-+-+-+-+-+-+-+-+-+-+-+-+-+-+-+-+-+-+-+-+-+-+-+-+-+-+-+-+-+-+-+-+
    |                         CmdCount=0x0X                         |
    +-+-+-+-+-+-+-+-+-+-+-+-+-+-+-+-+-+-+-+-+-+-+-+-+-+-+-+-+-+-+-+-+
    |                     StartLBA (read command 1)                 |
    +-+-+-+-+-+-+-+-+-+-+-+-+-+-+-+-+-+-+-+-+-+-+-+-+-+-+-+-+-+-+-+-+
    |                            BlkCount                           |
    +-+-+-+-+-+-+-+-+-+-+-+-+-+-+-+-+-+-+-+-+-+-+-+-+-+-+-+-+-+-+-+-+
    |                          Status/Type                          |
    +-+-+-+-+-+-+-+-+-+-+-+-+-+-+-+-+-+-+-+-+-+-+-+-+-+-+-+-+-+-+-+-+
                                     •
                                     •
    +-+-+-+-+-+-+-+-+-+-+-+-+-+-+-+-+-+-+-+-+-+-+-+-+-+-+-+-+-+-+-+-+
    |                     StartLBA (read command n)                 |
    +-+-+-+-+-+-+-+-+-+-+-+-+-+-+-+-+-+-+-+-+-+-+-+-+-+-+-+-+-+-+-+-+
    |                            BlkCount                           |
    +-+-+-+-+-+-+-+-+-+-+-+-+-+-+-+-+-+-+-+-+-+-+-+-+-+-+-+-+-+-+-+-+
    |                          Status/Type                          |
    +-+-+-+-+-+-+-+-+-+-+-+-+-+-+-+-+-+-+-+-+-+-+-+-+-+-+-+-+-+-+-+-+
```

Identify

```
0                   1                   2                   3
0 1 2 3 4 5 6 7 8 9 0 1 2 3 4 5 6 7 8 9 0 1 2 3 4 5 6 7 8 9 0 1 2
+-+-+-+-+-+-+-+-+-+-+-+-+-+-+-+-+-+-+-+-+-+-+-+-+-+-+-+-+-+-+-+-+
|                         Command=0x02                          |
+-+-+-+-+-+-+-+-+-+-+-+-+-+-+-+-+-+-+-+-+-+-+-+-+-+-+-+-+-+-+-+-+
|                        TransactionKey                         |
+-+-+-+-+-+-+-+-+-+-+-+-+-+-+-+-+-+-+-+-+-+-+-+-+-+-+-+-+-+-+-+-+
|       ClusterID=0xXX          |        LunID=0xXX             |
+-+-+-+-+-+-+-+-+-+-+-+-+-+-+-+-+-+-+-+-+-+-+-+-+-+-+-+-+-+-+-+-+
|                         CmdCount=0x01                         |
+-+-+-+-+-+-+-+-+-+-+-+-+-+-+-+-+-+-+-+-+-+-+-+-+-+-+-+-+-+-+-+-+
|C|             |     ECCT      |           VERSION             |
+-+-+-+-+-+-+-+-+-+-+-+-+-+-+-+-+-+-+-+-+-+-+-+-+-+-+-+-+-+-+-+-+
```

FIG.3A

```
 0                   1                   2                   3
 0 1 2 3 4 5 6 7 8 9 0 1 2 3 4 5 6 7 8 9 0 1 2 3 4 5 6 7 8 9 0 1 2
+-+-+-+-+-+-+-+-+-+-+-+-+-+-+-+-+-+-+-+-+-+-+-+-+-+-+-+-+-+-+-+-+
|                          Command=0x01                          |
+-+-+-+-+-+-+-+-+-+-+-+-+-+-+-+-+-+-+-+-+-+-+-+-+-+-+-+-+-+-+-+-+
|                          TransactionKey                        |
+-+-+-+-+-+-+-+-+-+-+-+-+-+-+-+-+-+-+-+-+-+-+-+-+-+-+-+-+-+-+-+-+
|        ClusterID=0xXX         |        LunID=0xXX              |
+-+-+-+-+-+-+-+-+-+-+-+-+-+-+-+-+-+-+-+-+-+-+-+-+-+-+-+-+-+-+-+-+
|                          CmdCount=0x01                         |
+-+-+-+-+-+-+-+-+-+-+-+-+-+-+-+-+-+-+-+-+-+-+-+-+-+-+-+-+-+-+-+-+
|                            BlkSize                             |
+-+-+-+-+-+-+-+-+-+-+-+-+-+-+-+-+-+-+-+-+-+-+-+-+-+-+-+-+-+-+-+-+
|                             MaxLBA                             |
+-+-+-+-+-+-+-+-+-+-+-+-+-+-+-+-+-+-+-+-+-+-+-+-+-+-+-+-+-+-+-+-+
|                         PreferredBlkSize                       |
+-+-+-+-+-+-+-+-+-+-+-+-+-+-+-+-+-+-+-+-+-+-+-+-+-+-+-+-+-+-+-+-+
|         MaxCmdsPerRqst        |         MaxBlksPerCmd          |
+-+-+-+-+-+-+-+-+-+-+-+-+-+-+-+-+-+-+-+-+-+-+-+-+-+-+-+-+-+-+-+-+
|       Serial Number (64 bytes)        ........................
+-+-+-+-+-+-+-+-+-+-+-+-+-+-+-+-+-+-+-+-+-+-+-+-+-+-+-+-+-+-+-+-+
|       Device Number (64 bytes)        ........................
+-+-+-+-+-+-+-+-+-+-+-+-+-+-+-+-+-+-+-+-+-+-+-+-+-+-+-+-+-+-+-+-+
|       Version Number (64 bytes)       ........................
+-+-+-+-+-+-+-+-+-+-+-+-+-+-+-+-+-+-+-+-+-+-+-+-+-+-+-+-+-+-+-+-+
```

FIG.3B

Read

```
 0                   1                   2                   3
 0 1 2 3 4 5 6 7 8 9 0 1 2 3 4 5 6 7 8 9 0 1 2 3 4 5 6 7 8 9 0 1 2
+-+-+-+-+-+-+-+-+-+-+-+-+-+-+-+-+-+-+-+-+-+-+-+-+-+-+-+-+-+-+-+-+
|                         Command=0x10                           |
+-+-+-+-+-+-+-+-+-+-+-+-+-+-+-+-+-+-+-+-+-+-+-+-+-+-+-+-+-+-+-+-+
|                         TransactionKey                         |
+-+-+-+-+-+-+-+-+-+-+-+-+-+-+-+-+-+-+-+-+-+-+-+-+-+-+-+-+-+-+-+-+
|       ClusterID=0xXX          |          LunID=0xXX            |
+-+-+-+-+-+-+-+-+-+-+-+-+-+-+-+-+-+-+-+-+-+-+-+-+-+-+-+-+-+-+-+-+
|                         CmdCount=0x0X                          |
+-+-+-+-+-+-+-+-+-+-+-+-+-+-+-+-+-+-+-+-+-+-+-+-+-+-+-+-+-+-+-+-+
|                    StartLBA (read command 1)                   |
+-+-+-+-+-+-+-+-+-+-+-+-+-+-+-+-+-+-+-+-+-+-+-+-+-+-+-+-+-+-+-+-+
|                            BlkCount                            |
+-+-+-+-+-+-+-+-+-+-+-+-+-+-+-+-+-+-+-+-+-+-+-+-+-+-+-+-+-+-+-+-+
|                           Status/Type                          |
+-+-+-+-+-+-+-+-+-+-+-+-+-+-+-+-+-+-+-+-+-+-+-+-+-+-+-+-+-+-+-+-+
                                •
                                •
+-+-+-+-+-+-+-+-+-+-+-+-+-+-+-+-+-+-+-+-+-+-+-+-+-+-+-+-+-+-+-+-+
|                    StartLBA (read command n)                   |
+-+-+-+-+-+-+-+-+-+-+-+-+-+-+-+-+-+-+-+-+-+-+-+-+-+-+-+-+-+-+-+-+
|                            BlkCount                            |
+-+-+-+-+-+-+-+-+-+-+-+-+-+-+-+-+-+-+-+-+-+-+-+-+-+-+-+-+-+-+-+-+
|                           Status/Type                          |
+-+-+-+-+-+-+-+-+-+-+-+-+-+-+-+-+-+-+-+-+-+-+-+-+-+-+-+-+-+-+-+-+
```

FIG.4A

```
0                   1                   2                   3
0 1 2 3 4 5 6 7 8 9 0 1 2 3 4 5 6 7 8 9 0 1 2 3 4 5 6 7 8 9 0 1 2
+-+-+-+-+-+-+-+-+-+-+-+-+-+-+-+-+-+-+-+-+-+-+-+-+-+-+-+-+-+-+-+-+
|                         Command=0x10                           |
+-+-+-+-+-+-+-+-+-+-+-+-+-+-+-+-+-+-+-+-+-+-+-+-+-+-+-+-+-+-+-+-+
|                         TransactionKey                         |
+-+-+-+-+-+-+-+-+-+-+-+-+-+-+-+-+-+-+-+-+-+-+-+-+-+-+-+-+-+-+-+-+
|        ClusterID=0xXX         |         LunID=0xXX             |
+-+-+-+-+-+-+-+-+-+-+-+-+-+-+-+-+-+-+-+-+-+-+-+-+-+-+-+-+-+-+-+-+
|                         CmdCount=0x0X                          |
+-+-+-+-+-+-+-+-+-+-+-+-+-+-+-+-+-+-+-+-+-+-+-+-+-+-+-+-+-+-+-+-+
|                    StartLBA (read command 1)                   |
+-+-+-+-+-+-+-+-+-+-+-+-+-+-+-+-+-+-+-+-+-+-+-+-+-+-+-+-+-+-+-+-+
|                         BlkCount                               |
+-+-+-+-+-+-+-+-+-+-+-+-+-+-+-+-+-+-+-+-+-+-+-+-+-+-+-+-+-+-+-+-+
|                         Status/Type                            |
+-+-+-+-+-+-+-+-+-+-+-+-+-+-+-+-+-+-+-+-+-+-+-+-+-+-+-+-+-+-+-+-+
|                    ECC optional only if C=1                    |
+-+-+-+-+-+-+-+-+-+-+-+-+-+-+-+-+-+-+-+-+-+-+-+-+-+-+-+-+-+-+-+-+
|      Data       |       ..........................   ...      |
+-+-+-+-+-+-+-+-+-+-+-+-+-+-+-+-+-+-+-+-+-+-+-+-+-+-+-+-+-+-+-+-+
                                 •
                                 •
+-+-+-+-+-+-+-+-+-+-+-+-+-+-+-+-+-+-+-+-+-+-+-+-+-+-+-+-+-+-+-+-+
|                    StartLBA (read command n)                   |
+-+-+-+-+-+-+-+-+-+-+-+-+-+-+-+-+-+-+-+-+-+-+-+-+-+-+-+-+-+-+-+-+
|                         BlkCount                               |
+-+-+-+-+-+-+-+-+-+-+-+-+-+-+-+-+-+-+-+-+-+-+-+-+-+-+-+-+-+-+-+-+
|                         Status/Type                            |
+-+-+-+-+-+-+-+-+-+-+-+-+-+-+-+-+-+-+-+-+-+-+-+-+-+-+-+-+-+-+-+-+
|                    ECC optional only if C=1                    |
+-+-+-+-+-+-+-+-+-+-+-+-+-+-+-+-+-+-+-+-+-+-+-+-+-+-+-+-+-+-+-+-+
|      Data       |       ................................      |
+-+-+-+-+-+-+-+-+-+-+-+-+-+-+-+-+-+-+-+-+-+-+-+-+-+-+-+-+-+-+-+-+
```

FIG.4B

```
Write 0                   1                   2                   3
0 1 2 3 4 5 6 7 8 9 0 1 2 3 4 5 6 7 8 9 0 1 2 3 4 5 6 7 8 9 0 1 2
+-+-+-+-+-+-+-+-+-+-+-+-+-+-+-+-+-+-+-+-+-+-+-+-+-+-+-+-+-+-+-+-+
|                        Command=0x20                            |
+-+-+-+-+-+-+-+-+-+-+-+-+-+-+-+-+-+-+-+-+-+-+-+-+-+-+-+-+-+-+-+-+
|                       TransactionKey                           |
+-+-+-+-+-+-+-+-+-+-+-+-+-+-+-+-+-+-+-+-+-+-+-+-+-+-+-+-+-+-+-+-+
|      ClusterID=0xXX         |          LunID=0xXX              |
+-+-+-+-+-+-+-+-+-+-+-+-+-+-+-+-+-+-+-+-+-+-+-+-+-+-+-+-+-+-+-+-+
|                       CmdCount=0x0X                            |
+-+-+-+-+-+-+-+-+-+-+-+-+-+-+-+-+-+-+-+-+-+-+-+-+-+-+-+-+-+-+-+-+
|                  Data Length MS=0xXXXXXXXX                     |
+-+-+-+-+-+-+-+-+-+-+-+-+-+-+-+-+-+-+-+-+-+-+-+-+-+-+-+-+-+-+-+-+
|                  Data Length LS=0xXXXXXXXX                     |
+-+-+-+-+-+-+-+-+-+-+-+-+-+-+-+-+-+-+-+-+-+-+-+-+-+-+-+-+-+-+-+-+
|                   StartLBA (write command 1)                   |
+-+-+-+-+-+-+-+-+-+-+-+-+-+-+-+-+-+-+-+-+-+-+-+-+-+-+-+-+-+-+-+-+
|                         BlkCount                               |
+-+-+-+-+-+-+-+-+-+-+-+-+-+-+-+-+-+-+-+-+-+-+-+-+-+-+-+-+-+-+-+-+
|                         Status/Type                            |
+-+-+-+-+-+-+-+-+-+-+-+-+-+-+-+-+-+-+-+-+-+-+-+-+-+-+-+-+-+-+-+-+
|                   ECC optional only if C=1                     |
+-+-+-+-+-+-+-+-+-+-+-+-+-+-+-+-+-+-+-+-+-+-+-+-+-+-+-+-+-+-+-+-+
|      Data       |  ........................  ...              |
+-+-+-+-+-+-+-+-+-+-+-+-+-+-+-+-+-+-+-+-+-+-+-+-+-+-+-+-+-+-+-+-+
                                  ●
                                  ●
+-+-+-+-+-+-+-+-+-+-+-+-+-+-+-+-+-+-+-+-+-+-+-+-+-+-+-+-+-+-+-+-+
|                   StartLBA (write command n)                   |
+-+-+-+-+-+-+-+-+-+-+-+-+-+-+-+-+-+-+-+-+-+-+-+-+-+-+-+-+-+-+-+-+
|                         BlkCount                               |
+-+-+-+-+-+-+-+-+-+-+-+-+-+-+-+-+-+-+-+-+-+-+-+-+-+-+-+-+-+-+-+-+
|                         Status/Type                            |
+-+-+-+-+-+-+-+-+-+-+-+-+-+-+-+-+-+-+-+-+-+-+-+-+-+-+-+-+-+-+-+-+
|                   ECC optional only if C=1                     |
+-+-+-+-+-+-+-+-+-+-+-+-+-+-+-+-+-+-+-+-+-+-+-+-+-+-+-+-+-+-+-+-+
|      Data       |  ...............................            |
+-+-+-+-+-+-+-+-+-+-+-+-+-+-+-+-+-+-+-+-+-+-+-+-+-+-+-+-+-+-+-+-+
```

FIG.5A

```
0                   1                   2                   3
0 1 2 3 4 5 6 7 8 9 0 1 2 3 4 5 6 7 8 9 0 1 2 3 4 5 6 7 8 9 0 1 2
+-+-+-+-+-+-+-+-+-+-+-+-+-+-+-+-+-+-+-+-+-+-+-+-+-+-+-+-+-+-+-+-+
|                       Command=0x20                            |
+-+-+-+-+-+-+-+-+-+-+-+-+-+-+-+-+-+-+-+-+-+-+-+-+-+-+-+-+-+-+-+-+
|                       TransactionKey                          |
+-+-+-+-+-+-+-+-+-+-+-+-+-+-+-+-+-+-+-+-+-+-+-+-+-+-+-+-+-+-+-+-+
|       ClusterID=0xXX          |        LunID=0xXX             |
+-+-+-+-+-+-+-+-+-+-+-+-+-+-+-+-+-+-+-+-+-+-+-+-+-+-+-+-+-+-+-+-+
|                       CmdCount=0x0X                           |
+-+-+-+-+-+-+-+-+-+-+-+-+-+-+-+-+-+-+-+-+-+-+-+-+-+-+-+-+-+-+-+-+
|                   Data Length MS=0xXXXXXXXX                   |
+-+-+-+-+-+-+-+-+-+-+-+-+-+-+-+-+-+-+-+-+-+-+-+-+-+-+-+-+-+-+-+-+
|                   Data Length LS=0xXXXXXXXX                   |
+-+-+-+-+-+-+-+-+-+-+-+-+-+-+-+-+-+-+-+-+-+-+-+-+-+-+-+-+-+-+-+-+
|                   StartLBA (write command 1)                  |
+-+-+-+-+-+-+-+-+-+-+-+-+-+-+-+-+-+-+-+-+-+-+-+-+-+-+-+-+-+-+-+-+
|                           BlkCount                            |
+-+-+-+-+-+-+-+-+-+-+-+-+-+-+-+-+-+-+-+-+-+-+-+-+-+-+-+-+-+-+-+-+
|                          Status/Type                          |
+-+-+-+-+-+-+-+-+-+-+-+-+-+-+-+-+-+-+-+-+-+-+-+-+-+-+-+-+-+-+-+-+
                                •
                                •
+-+-+-+-+-+-+-+-+-+-+-+-+-+-+-+-+-+-+-+-+-+-+-+-+-+-+-+-+-+-+-+-+
|                   StartLBA (write command n)                  |
+-+-+-+-+-+-+-+-+-+-+-+-+-+-+-+-+-+-+-+-+-+-+-+-+-+-+-+-+-+-+-+-+
|                           BlkCount                            |
+-+-+-+-+-+-+-+-+-+-+-+-+-+-+-+-+-+-+-+-+-+-+-+-+-+-+-+-+-+-+-+-+
|                          Status/Type                          |
+-+-+-+-+-+-+-+-+-+-+-+-+-+-+-+-+-+-+-+-+-+-+-+-+-+-+-+-+-+-+-+-+
```

FIG.5B

```
WriteNow
 0                   1                   2                   3
 0 1 2 3 4 5 6 7 8 9 0 1 2 3 4 5 6 7 8 9 0 1 2 3 4 5 6 7 8 9 0 1 2
+-+-+-+-+-+-+-+-+-+-+-+-+-+-+-+-+-+-+-+-+-+-+-+-+-+-+-+-+-+-+-+-+
|                       Command=0x21                            |
+-+-+-+-+-+-+-+-+-+-+-+-+-+-+-+-+-+-+-+-+-+-+-+-+-+-+-+-+-+-+-+-+
|                       TransactionKey                          |
+-+-+-+-+-+-+-+-+-+-+-+-+-+-+-+-+-+-+-+-+-+-+-+-+-+-+-+-+-+-+-+-+
|      ClusterID=0xXX           |        LunID=0xXX             |
+-+-+-+-+-+-+-+-+-+-+-+-+-+-+-+-+-+-+-+-+-+-+-+-+-+-+-+-+-+-+-+-+
|                       CmdCount=0x0X                           |
+-+-+-+-+-+-+-+-+-+-+-+-+-+-+-+-+-+-+-+-+-+-+-+-+-+-+-+-+-+-+-+-+
|                  StartLBA (write command 1)                   |
+-+-+-+-+-+-+-+-+-+-+-+-+-+-+-+-+-+-+-+-+-+-+-+-+-+-+-+-+-+-+-+-+
|                         BlkCount                              |
+-+-+-+-+-+-+-+-+-+-+-+-+-+-+-+-+-+-+-+-+-+-+-+-+-+-+-+-+-+-+-+-+
|                        Status/Type                            |
+-+-+-+-+-+-+-+-+-+-+-+-+-+-+-+-+-+-+-+-+-+-+-+-+-+-+-+-+-+-+-+-+
|                   ECC optional only if C=1                    |
+-+-+-+-+-+-+-+-+-+-+-+-+-+-+-+-+-+-+-+-+-+-+-+-+-+-+-+-+-+-+-+-+
|     Data      |   ........................   ...             |
+-+-+-+-+-+-+-+-+-+-+-+-+-+-+-+-+-+-+-+-+-+-+-+-+-+-+-+-+-+-+-+-+
                                 •
                                 •
+-+-+-+-+-+-+-+-+-+-+-+-+-+-+-+-+-+-+-+-+-+-+-+-+-+-+-+-+-+-+-+-+
|                  StartLBA (write command n)                   |
+-+-+-+-+-+-+-+-+-+-+-+-+-+-+-+-+-+-+-+-+-+-+-+-+-+-+-+-+-+-+-+-+
|                         BlkCount                              |
+-+-+-+-+-+-+-+-+-+-+-+-+-+-+-+-+-+-+-+-+-+-+-+-+-+-+-+-+-+-+-+-+
|                        Status/Type                            |
+-+-+-+-+-+-+-+-+-+-+-+-+-+-+-+-+-+-+-+-+-+-+-+-+-+-+-+-+-+-+-+-+
|                   ECC optional only if C=1                    |
+-+-+-+-+-+-+-+-+-+-+-+-+-+-+-+-+-+-+-+-+-+-+-+-+-+-+-+-+-+-+-+-+
|     Data      |   ..................................         |
+-+-+-+-+-+-+-+-+-+-+-+-+-+-+-+-+-+-+-+-+-+-+-+-+-+-+-+-+-+-+-+-+
```

FIG.6A

```
 0                   1                   2                   3
 0 1 2 3 4 5 6 7 8 9 0 1 2 3 4 5 6 7 8 9 0 1 2 3 4 5 6 7 8 9 0 1 2
+-+-+-+-+-+-+-+-+-+-+-+-+-+-+-+-+-+-+-+-+-+-+-+-+-+-+-+-+-+-+-+-+
|                         Command=0x21                          |
+-+-+-+-+-+-+-+-+-+-+-+-+-+-+-+-+-+-+-+-+-+-+-+-+-+-+-+-+-+-+-+-+
|                        TransactionKey                         |
+-+-+-+-+-+-+-+-+-+-+-+-+-+-+-+-+-+-+-+-+-+-+-+-+-+-+-+-+-+-+-+-+
|       ClusterID=0xXX          |         LunID=0xXX            |
+-+-+-+-+-+-+-+-+-+-+-+-+-+-+-+-+-+-+-+-+-+-+-+-+-+-+-+-+-+-+-+-+
|                         CmdCount=0x0X                         |
+-+-+-+-+-+-+-+-+-+-+-+-+-+-+-+-+-+-+-+-+-+-+-+-+-+-+-+-+-+-+-+-+
|                    StartLBA (write command 1)                 |
+-+-+-+-+-+-+-+-+-+-+-+-+-+-+-+-+-+-+-+-+-+-+-+-+-+-+-+-+-+-+-+-+
|                           BlkCount                            |
+-+-+-+-+-+-+-+-+-+-+-+-+-+-+-+-+-+-+-+-+-+-+-+-+-+-+-+-+-+-+-+-+
|                          Status/Type                          |
+-+-+-+-+-+-+-+-+-+-+-+-+-+-+-+-+-+-+-+-+-+-+-+-+-+-+-+-+-+-+-+-+
                                •
                                •
+-+-+-+-+-+-+-+-+-+-+-+-+-+-+-+-+-+-+-+-+-+-+-+-+-+-+-+-+-+-+-+-+
|                    StartLBA (write command n)                 |
+-+-+-+-+-+-+-+-+-+-+-+-+-+-+-+-+-+-+-+-+-+-+-+-+-+-+-+-+-+-+-+-+
|                           BlkCount                            |
+-+-+-+-+-+-+-+-+-+-+-+-+-+-+-+-+-+-+-+-+-+-+-+-+-+-+-+-+-+-+-+-+
|                          Status/Type                          |
+-+-+-+-+-+-+-+-+-+-+-+-+-+-+-+-+-+-+-+-+-+-+-+-+-+-+-+-+-+-+-+-+
```

FIG.6B

Disconnect

```
0                   1                   2                   3
0 1 2 3 4 5 6 7 8 9 0 1 2 3 4 5 6 7 8 9 0 1 2 3 4 5 6 7 8 9 0 1 2
+-+-+-+-+-+-+-+-+-+-+-+-+-+-+-+-+-+-+-+-+-+-+-+-+-+-+-+-+-+-+-+-+
|                         Command=0x41                          |
+-+-+-+-+-+-+-+-+-+-+-+-+-+-+-+-+-+-+-+-+-+-+-+-+-+-+-+-+-+-+-+-+
|                        TransactionKey                         |
+-+-+-+-+-+-+-+-+-+-+-+-+-+-+-+-+-+-+-+-+-+-+-+-+-+-+-+-+-+-+-+-+
|        ClusterID=0xXX         |         LunID=0xXX            |
+-+-+-+-+-+-+-+-+-+-+-+-+-+-+-+-+-+-+-+-+-+-+-+-+-+-+-+-+-+-+-+-+
|                         CmdCount=0x00                         |
+-+-+-+-+-+-+-+-+-+-+-+-+-+-+-+-+-+-+-+-+-+-+-+-+-+-+-+-+-+-+-+-+
```

FIG.7A

```
0                   1                   2                   3
0 1 2 3 4 5 6 7 8 9 0 1 2 3 4 5 6 7 8 9 0 1 2 3 4 5 6 7 8 9 0 1 2
+-+-+-+-+-+-+-+-+-+-+-+-+-+-+-+-+-+-+-+-+-+-+-+-+-+-+-+-+-+-+-+-+
|                         Command=0x41                          |
+-+-+-+-+-+-+-+-+-+-+-+-+-+-+-+-+-+-+-+-+-+-+-+-+-+-+-+-+-+-+-+-+
|                        TransactionKey                         |
+-+-+-+-+-+-+-+-+-+-+-+-+-+-+-+-+-+-+-+-+-+-+-+-+-+-+-+-+-+-+-+-+
|        ClusterID=0xXX         |         LunID=0xXX            |
+-+-+-+-+-+-+-+-+-+-+-+-+-+-+-+-+-+-+-+-+-+-+-+-+-+-+-+-+-+-+-+-+
|                         CmdCount=0x00                         |
+-+-+-+-+-+-+-+-+-+-+-+-+-+-+-+-+-+-+-+-+-+-+-+-+-+-+-+-+-+-+-+-+
```

FIG.7B

Ping

```
 0                   1                   2                   3
 0 1 2 3 4 5 6 7 8 9 0 1 2 3 4 5 6 7 8 9 0 1 2 3 4 5 6 7 8 9 0 1 2
+-+-+-+-+-+-+-+-+-+-+-+-+-+-+-+-+-+-+-+-+-+-+-+-+-+-+-+-+-+-+-+-+
|                         Command=0x01                          |
+-+-+-+-+-+-+-+-+-+-+-+-+-+-+-+-+-+-+-+-+-+-+-+-+-+-+-+-+-+-+-+-+
|                         TransactionKey                        |
+-+-+-+-+-+-+-+-+-+-+-+-+-+-+-+-+-+-+-+-+-+-+-+-+-+-+-+-+-+-+-+-+
|        ClusterID=0xXX         |         LunID=0xXX            |
+-+-+-+-+-+-+-+-+-+-+-+-+-+-+-+-+-+-+-+-+-+-+-+-+-+-+-+-+-+-+-+-+
|                         CmdCount=0x01                         |
+-+-+-+-+-+-+-+-+-+-+-+-+-+-+-+-+-+-+-+-+-+-+-+-+-+-+-+-+-+-+-+-+
|                              t0                               |
+-+-+-+-+-+-+-+-+-+-+-+-+-+-+-+-+-+-+-+-+-+-+-+-+-+-+-+-+-+-+-+-+
```

FIG.8A

```
 0                   1                   2                   3
 0 1 2 3 4 5 6 7 8 9 0 1 2 3 4 5 6 7 8 9 0 1 2 3 4 5 6 7 8 9 0 1 2
+-+-+-+-+-+-+-+-+-+-+-+-+-+-+-+-+-+-+-+-+-+-+-+-+-+-+-+-+-+-+-+-+
|                         Command=0x01                          |
+-+-+-+-+-+-+-+-+-+-+-+-+-+-+-+-+-+-+-+-+-+-+-+-+-+-+-+-+-+-+-+-+
|                         TransactionKey                        |
+-+-+-+-+-+-+-+-+-+-+-+-+-+-+-+-+-+-+-+-+-+-+-+-+-+-+-+-+-+-+-+-+
|        ClusterID=0xXX         |         LunID=0xXX            |
+-+-+-+-+-+-+-+-+-+-+-+-+-+-+-+-+-+-+-+-+-+-+-+-+-+-+-+-+-+-+-+-+
|                         CmdCount=0x01                         |
+-+-+-+-+-+-+-+-+-+-+-+-+-+-+-+-+-+-+-+-+-+-+-+-+-+-+-+-+-+-+-+-+
|                              t0                               |
+-+-+-+-+-+-+-+-+-+-+-+-+-+-+-+-+-+-+-+-+-+-+-+-+-+-+-+-+-+-+-+-+
|                              t1                               |
+-+-+-+-+-+-+-+-+-+-+-+-+-+-+-+-+-+-+-+-+-+-+-+-+-+-+-+-+-+-+-+-+
|                              t2                               |
+-+-+-+-+-+-+-+-+-+-+-+-+-+-+-+-+-+-+-+-+-+-+-+-+-+-+-+-+-+-+-+-+
```

FIG.8B

```
 0                   1                   2                   3
 0 1 2 3 4 5 6 7 8 9 0 1 2 3 4 5 6 7 8 9 0 1 2 3 4 5 6 7 8 9 0 1 2
+-+-+-+-+-+-+-+-+-+-+-+-+-+-+-+-+-+-+-+-+-+-+-+-+-+-+-+-+-+-+-+-+
|                         Command=0x01                          |
+-+-+-+-+-+-+-+-+-+-+-+-+-+-+-+-+-+-+-+-+-+-+-+-+-+-+-+-+-+-+-+-+
|                         TransactionKey                        |
+-+-+-+-+-+-+-+-+-+-+-+-+-+-+-+-+-+-+-+-+-+-+-+-+-+-+-+-+-+-+-+-+
|      ClusterID=0xXX           |         LunID=0xXX            |
+-+-+-+-+-+-+-+-+-+-+-+-+-+-+-+-+-+-+-+-+-+-+-+-+-+-+-+-+-+-+-+-+
|                         CmdCount=0x01                         |
+-+-+-+-+-+-+-+-+-+-+-+-+-+-+-+-+-+-+-+-+-+-+-+-+-+-+-+-+-+-+-+-+
|                              t0                               |
+-+-+-+-+-+-+-+-+-+-+-+-+-+-+-+-+-+-+-+-+-+-+-+-+-+-+-+-+-+-+-+-+
|                              t1                               |
+-+-+-+-+-+-+-+-+-+-+-+-+-+-+-+-+-+-+-+-+-+-+-+-+-+-+-+-+-+-+-+-+
|                              t2                               |
+-+-+-+-+-+-+-+-+-+-+-+-+-+-+-+-+-+-+-+-+-+-+-+-+-+-+-+-+-+-+-+-+
|                              t3                               |
+-+-+-+-+-+-+-+-+-+-+-+-+-+-+-+-+-+-+-+-+-+-+-+-+-+-+-+-+-+-+-+-+
```

FIG.8C

BLOCK DATA STORAGE WITHIN A COMPUTER NETWORK

FIELD OF THE INVENTION

The present invention relates to computer data storage and, in particular, to the storage of data on block data storage devices within a computer network.

BACKGROUND OF THE INVENTION

A typical computer system includes a processor for executing instructions, a memory for storing the instructions executed by the processor and the results of the execution of instructions, an input peripheral that permits a user to interact with the system (e.g., keyboard, mouse etc.), an output peripheral that also allows a user to interact with the system (e.g., monitor, printer etc.), and a storage peripheral (e.g., disk drive, tape drive etc.) that provides data storage beyond that provided by the memory. When the computer system is in operation, the memory typically contains at least portions of two programs, an operating system program and an application program (e.g., a spreadsheet program). The operating system program provides a number of functions, including functions associated with the management of files, directories of files, and the input and output peripherals associated with computer system. If the application program requires the performance of any of these functions (e.g., the output of information to a video monitor), the application program submits a request to the operating system for the desired function and the operating system carries out whatever operations are required to implement the function.

On a larger scale, computer systems are commonly connected to one another to form computer networks. Common networks include local area networks (LANs) in which the computer systems that are networked together are distributed over a relatively small area, such as within an office or a building. Another common network is a wide area network (WAN) in which the computer systems that are part of the network are distributed over a relatively large area. As a consequence, third party communication systems (e.g., telephone and satellite) are commonly required to implement a wide area network.

A fundamental advantage of a computer network is that one computer system can write data to or read data from a memory device associated with another computer system within the network. However, before computer systems could be networked together and read and write data in this manner, certain limitations inherent in the "local" nature of many of the operating systems installed in the computer systems had to be overcome. To elaborate, many operating systems are only capable of processing requests for communications with memory devices that are associated with the computer system with which the operating system is associated, i.e., "local" memory devices. As a consequence, these operating systems were incapable of processing requests for communications with a "remote" memory device, i.e., a memory device that is not associated with the computer system with which the operating system was associated. To overcome this limitation, "virtual device drivers" were conceived.

Generally, a virtual device driver functions so as to make a remote memory device appear to be a local memory device to the operating system of a computer system and manages communications with a remotely located memory device. The virtual device driver is also comprised of two components, an initiating virtual device driver that is associated with the computer system that is initiating a communication with a remote memory device and a target virtual device driver that is associated with the computer system with which the remote memory device is associated. In many cases, the "initiating" computer system has memory devices that are remote relative to the "target" computer system and that the "target" computer system would want to access. In such cases the virtual device drivers associated with the computer systems are typically capable of reversing roles, i.e., an initiating virtual device driver also functions as a target virtual device driver and vice versa.

To make a remote memory device appear to an operating system to a local memory device, the "initiating virtual device driver" communicates with the operating system of a computer system in the same manner that a local memory device communicates with the operating system. However, to manage communications with a remote memory device, the "initiating virtual device driver" communicates with the portion of a computer system that is responsible for conducting communications with other computer systems in a computer network over a network communication infrastructure (e.g., copper cable, fibre optic cable, radio channel etc.). This portion of the computer system is typically referred to as a network interface and is commonly implemented in the form of a network interface card. In any case, the initiating virtual device driver provides communications that are to be sent to a remote memory device to the network interface, which encapsulates the communication according to the protocol for transmitting the communication over the network communication infrastructure. For example, the network interface could encapsulate the communication under the TCP/IP protocol for transmission over the Internet. In the case of communications received from the remote memory device in response to communication initiated by the initiating computer system, the network interface strips the communication of the network infrastructure protocol information and then provides the communication to the initiating virtual device driver. The initiating virtual device driver then transmits the communication to the operating system for any further processing.

The target virtual device driver in the target computer system (i.e., the computer system with which the remote memory device is associated) operates in much the same manner as the initiating virtual device driver. To elaborate, the network interface of the target computer system strips communications from the initiating computer system and then provides the communications to the target virtual device driver. In response, the target virtual device driver conveys the communication on to the remote memory device. Any response from the remote memory device is provided to the target virtual device driver, which causes the response to be conveyed to the network interface. The network interface then operates to encapsulate the response or communication for transmission over the network infrastructure to the initiating computer system.

Typically, the "virtual device drivers" employed in computer networks are device protocol dependent. For example, if the remote memory device is a SCSI disk drive, the "initiating virtual device driver" in the initiating computer implements the complete SCSI command set necessary to communicate with the remote SCSI disk drive. For example, if the application executing on the initiating computer requires data to be read from a remote SCSI disk drive, the initiating virtual device driver on the initiating computer operates so as to cause all of the necessary SCSI commands needed to implement the read operation to be communicated over the network infrastructure and, if necessary process any responses to the commands. This may involve several communications over the network. For example, the first communication could be a status request to insure that SCSI the disk drive is operating; the second command could be a request for access to the drive; the third command could be a seek command to move a read head to the track on which the desired data is located.

This system for transferring data between computer systems in a network has worked adequately for some time because the network infrastructure has been considerably slower in transferring data between the computer systems than the operating system associated with the target computer system has been able to cause data to be moved to or from a remote memory device associated with the target computer system. Stated differently, target computer systems and, in particular, the operating system of the target computer system have been capable of causing data to be transferred to other computer systems in a computer network at a speed that substantially utilizes the available bandwidth of the network infrastructure.

Recently, however, the bandwidth or speed of network infrastructure has increased dramatically. As a consequence, the network infrastructure is no longer the slowest element in the transfer of data between one computer system and another computer system in a computer network. Instead, the target computer system and, more specifically, the operating system of the target computer system has become the slowest element. To elaborate, because the operating system associated with the target computer system is typically processing requests from one or more application programs running on the system, managing the peripherals, and performing other tasks, the operating system can only devote a portion of its time to processing data transfers with other computer systems in the network. Further, the time that the operating system can devote to such transfers is now, usually insufficient to fully utilize the bandwidth or speed at which the network infrastructure is capable of transporting data.

As a consequence of the operating system limitation associated with transferring data between computer systems in computer network that utilize high speed network infrastructures, a new type of storage system or device has evolved, namely, a network attached storage device. A network attached storage system or device is a computer system that is dedicated to the function of data storage. Consequently, the operating system associated with the network attached storage device does not spend any time, like conventional computer systems, directly servicing requests from application programs and the like. This, in turn, makes network attached storage devices able to transfer data to other computer systems in a network must faster than the typical, conventional computer system. Moreover, when a network storage device is installed in a computer network, the device is provided with its own address within the network and is, therefore, directly accessible to the other computer systems in the network. This direct accessibility also translates into improved data transfer rates.

SUMMARY OF THE INVENTION

One embodiment of the present invention provides a network attached storage device (NAS device) that facilitates the transfer of data with a block data storage device that is associated with the NAS device or is to be associated with the NAS device and is considered remote relative to other computer devices in a network. NAS device in this context refers to a network enabled storage device (i.e., a device that is dedicated to data storage and has its own network address) but instead of being utilized to transfer files is involved in the transfer of blocks of data. The facilitating of the transfer of data is based upon the recognition of at least two factors. First, block data storage devices that store multiple bytes of data in contiguous areas on a storage medium, such as disk drives, are typically capable of performing a number of functions, which are commonly reflected in a command set. For instance, a typical command set for a disk drive might include seek, search, load, unload, read and write commands. Second, an application program executing on a computer that requires access to a remotely located block data storage device only requires access for a limited number of functions. Consequently, the NAS device facilitates the transfer of data by limiting, relative to the complete command set for the block data storage device that is associated with or is to be associated with the NAS device, the number of functions or commands from a computer system in a network with respect to which the block data storage device is considered remote that will be received and processed to a subset of the complete command set. In one embodiment, the subset includes read and write commands but excludes commands that are specific to the movement of actuators within the block storage device. For example, in the case of a disk drive, a seek command that is specifically involves the use of an actuator to move a head across the disk surface would be excluded from the subset. In another embodiment, the commands are generic to at least two and preferably several types of data block storage devices. Consequently, data transfer between the NAS device and the remote computer is independent of the type of block data storage device associated or to be associated with the NAS device or, stated differently, interface independent. Hereinafter, the commands from a remote computer system that the NAS device processes will be referred to as network commands.

The NAS device of the present invention comprises two interfaces: (1) a network interface for transmitting/receiving communications to/from a network infrastructure (e.g., a LAN or WAN), where the network interface is capable of implementing a data packet protocol (e.g. TCP/IP) and (2) a block data storage device interface for transmitting/receiving communications to/from a block data storage device. The NAS device further comprises an operating system with a block data storage processor (which can be thought of as the target side of a new type of virtual device driver). The block data storage processor is capable of receiving a network command that has been received at the network interface and generating a string of one or more commands specific to the block data storage device that are needed to carry out the network command. For example, if the processor receives a "read" network command from the network interface, the processor may have to issue commands to a disk drive requesting the status and/or availability of the device, reserving the device, loading the read/write head onto the disk, seeking to the track at which a desired block of data is locating, and then searching for the sector on the track at which the block of data is located, and finally issuing the device specific read command to cause the requested data to be read. The block data storage processor is also capable of causing any such string of commands to be transmitted to the block data storage interface for subsequent conveyance to a block data storage device. Further, the processor is capable of receiving any response to a command from the block data storage device interface and, if necessary, sending data to the network interface for transmission over a network infrastructure to the computer system that requested the data.

In one embodiment, the block data storage processor includes the capability of processing network commands in a parallel fashion. The processing of commands in parallel can be conceptualized as separate "threads," with each thread relating to a network command or related group of network commands. In one embodiment, the processor includes the ability to create multiple command queues, each with an associated "thread" for carrying out a network command or commands in the command queue with which it is associated. The processor further includes a director that is capable of directing network commands to the queues for processing. In one embodiment, the director is capable of monitoring the load in the multiple queues and deciding in which queue a command is to be placed so as to achieve a desired objective. For instance, the director is capable of implementing an algorithm that balances the load in queues so as to maximize throughput.

A further embodiment of the invention includes a computer structure that, in practice, is implemented on a host computer relative to which the NAS device is considered a remote device. The structure comprises an operating system with a host block storage device processor (which can be thought of as the initiator side of a new type of virtual device driver) that is capable of processing file requests from application programs that execute on the host computer, where at least a portion of the file resides on a block data storage device associated with the remote NAS device. To elaborate, the operating system with the processor is capable of receiving a file request from an application program executing on a host computer, transforming the file request into a network command, providing the network command to a network interface associated with the host computer so that the network interface can cause the network command to be transported to the NAS device with the remote block data storage device. Additionally, the operating system with the processor is capable of receiving a reply to the network command that is received at the network interface of the host computer and conveying the reply on to the application program. For example, if an application executing on the host computer needs data contained in a file "xyz" that is located on a block data storage device associated with the NAS device, the application generates a request that is conveyed to the processor. The processor, in response to the request, transforms or translates the request for the file "xyz" into a network command, i.e., a block read command for the block or blocks on the block data storage device associated with the NAS device that contain the "xyz" file. In addition, the processor causes the network commands to be conveyed to the network interface of the host computer for transport over the network infrastructure to the NAS device. The NAS device processes the network command and causes the data block or blocks containing the requested "xyz" file to be conveyed over the network infrastructure to the network interface of the host computer. The data block or blocks are, in turn, conveyed to the processor. In response, the processor conveys or otherwise makes available the block or blocks to the requesting application.

Yet a further embodiment of the invention includes a host computer that includes the previously noted operating system with host block storage device processor and a host network interface for transmitting/receiving communications to/from a network infrastructure, where the network interface is implements a data packet protocol, (e.g. TCP/IP). Another embodiment includes the network infrastructure, which can be implemented in many different forms, including LANs and WANs.

A further embodiment of the invention involves a method for communicating between a host computer and target computer, such as a NAS device, with which a block data storage device is associated. The method comprises providing a network infrastructure for conveying communications between a host computer and a target computer. The method further comprises transporting a network command, i.e., a generic or interface independent command relative to two or more block data storage devices or a command within a subset of a complete command set for a block data storage device, over the network infrastructure. In one embodiment, the network commands that are transported over the network infrastructure comprise commands that are generic or interface independent relative to block data storage devices or a subset of a complete command set for a block data storage device, and commands that are neither generic or part of such a subset. For instance, in one embodiment, the commands comprise a "ping" network command that is useful in determining network latencies and a disconnect network command that is used to terminate a connection between the host computer and the target computer.

BRIEF DESCRIPTION OF THE DRAWINGS

FIGS. 3A–3B respectively illustrate the identify network command and the acknowledgment thereof;

FIGS. 4A–4B respectively illustrate read network command and the acknowledgment thereof;

FIGS. 5A–5B respectively illustrate the write network command and the acknowledgment thereof;

FIGS. 6A–6B respectively illustrate the write/now network command and the acknowledgment thereof;

FIGS. 7A–7B respectively illustrate the disconnect network command and the acknowledgment thereof;

FIGS. 8A–8C respectively illustrate the "ping" network command, the acknowledgment of the command, and the completed command;

DETAILED DESCRIPTION

Figure 1:
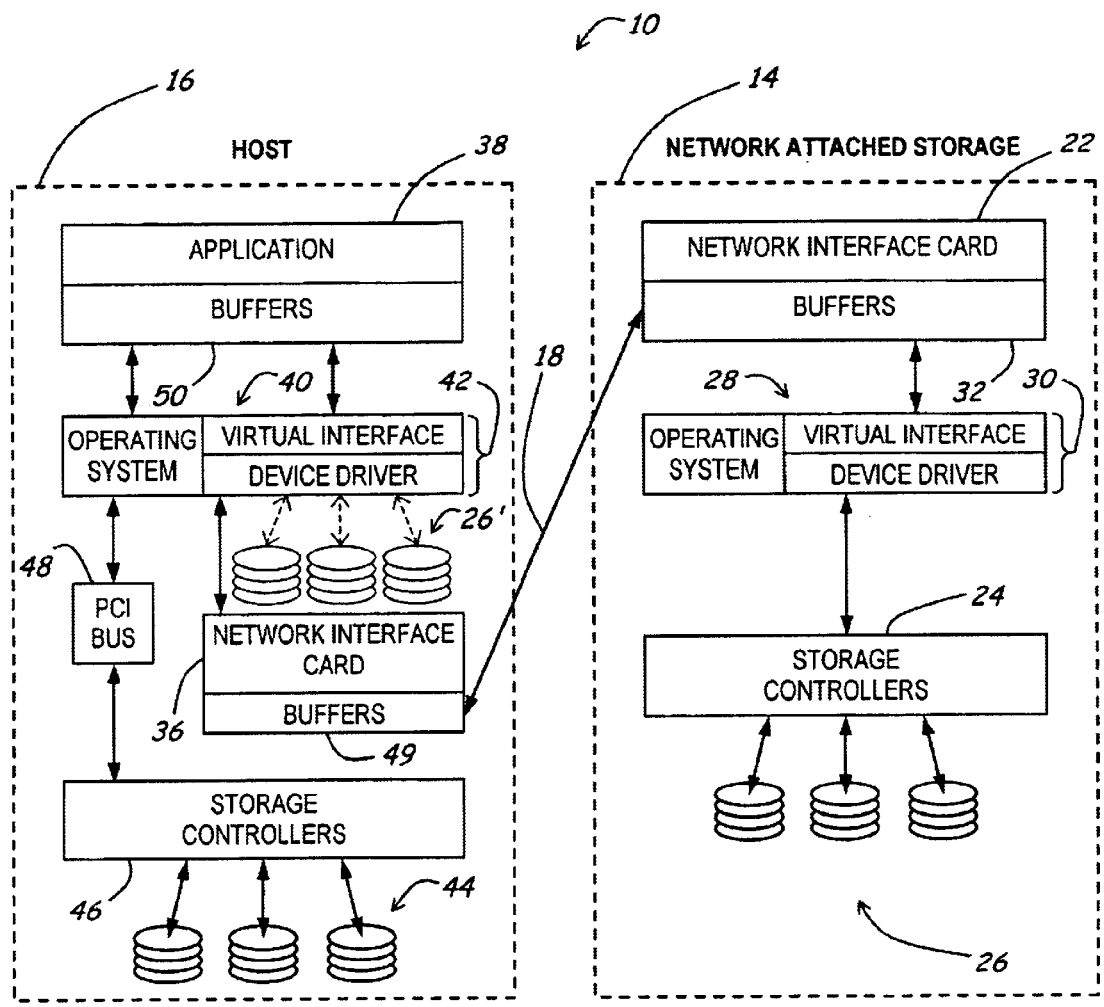
FIG. 1 is a block diagram of a computer network that embodies the present invention and includes a host computer, a target computer with a block data storage device that is remote relative to the host computer, and a network infrastructure for conveying communications between the host computer and the target computer.

FIG. 1 is a block diagram of a computer network 10 that includes an embodiment of the present invention. Generally, the computer network 10 comprises a network attached storage device or system 14 (hereinafter referred to as the NAS device 14), a host computer 16 with respect to which any block data storage devices in the NAS device 14 are considered remote, and a network infrastructure 18 for conveying data between the NAS device 14 and the host computer 16.

The NAS device 14 comprises a storage device network interface 22 for transmitting/receiving communications to/from the network infrastructure 18 according to a packet protocol (e.g. TCP/IP). Consequently, the interface 22 is capable of packetizing communications that are to be transmitted over the network infrastructure 18 and recombining related packets that are received from the network infrastructure 18. Also included within the NAS storage device 14 is a block storage device interface 24 that, in the illustrated embodiment, takes the form of a block storage device controller. The block storage device interface 24 manages the physical communications with one or more block data storage devices 26. More specifically, the block storage device interface 24 handles the sequences of electrical signals that are required to communicate with the one or more block data storage devices 26.

The block data storage devices 26 are data storage devices that store data in blocks that have a specified length (e.g., 512 bytes) and that each have a unique address. The block data storage devices 26 will typically be all of the same type and all capable of holding the same amount of data (e.g., SCSI disk drives that are each capable of holding 10 GB of data). However, the block data storage devices can be of different types (e.g., disk drives and tape drives or of different sub-types (e.g., SCSI disk drives and ATA disk drives). The block data storage devices 26 can also hold different amounts of data. Further, the block data storage devices 26 can be configured to implement various storage configurations, such as RAID.

The NAS device 14 further comprises an operating system 28 that includes a block storage device processor 30 which is capable of receiving network commands from the network interface 22. A network command is a command that is within a subset of the complete command set for a block data storage devices or generic to the complete command sets for more than one type of block data storage device or independent of the interface of any block data storage device. In one embodiment, the subset of network commands includes "read" and "write" commands that are generic or interface independent relative to the actual block data storage device 26 and excludes most, if not all, of the other block data storage device commands. Consequently, commands that are specifically directed to the movement of actuators and the like in the block data storage device, such as seek commands that involve moving the actuator within a disk drive from one track to another track, are excluded. A set of network commands can also include commands that are not within the complete command set of a block data storage device or generic or interface independent relative to the complete command sets of two or more block data storage devices. For example, network commands can include commands that relate to the network and not to a block data storage device. For example, a "ping" command can be utilized to determine network latencies.

The block storage device processor 30 is also capable of processing a network command to produce a string of one or more device specific commands for the particular one of the block data storage devices 26 to which a network command relates. For instance, if the network command is a "read" network command that is directed to a disk drive that is one of the block data storage devices 26, the block storage device processor 30 processor may issue device specific commands that reserve the drive, cause the actuator to move the read/write head to the track at which the block is located, read the block of data and put the data in a cache, and read the block of data from the cache. Typically, the second and subsequent device specific commands in a string are each generated after the outcome of the prior command is known, thereby allowing the processor to take into account, in determining the second and subsequent commands, the responses to one or more prior commands where there are multiple, possible outcomes to at least one prior command. For example, if the response to a device specific status command indicates that the device is busy, the processor may cause the status command to be reissued. If, however, the response to a device specific status command indicates that the device is available, the processor may issue a command to reserve the device. The block storage device processor 30 is further capable of conveying the device specific commands to the block storage device interface, which operates to convey the commands to the particular block data storage device. Additionally, the block storage device processor 30 is capable of receiving any replies to the string of commands from the block data storage devices 26 and processing any replies. The block storage device processor 30 is also capable of conveying any reply from the block data storage devices 26 that satisfies a network command to the storage device network interface 22. For instance, if the network command received at the network interface was a "read" network command, the processor 30 is capable of causing the block of data that has been read from the device to be conveyed on to the storage device network interface 22 for transport over the network infrastructure 18 to the host computer 16.

In one embodiment, the operating system 28 is a Linux operating system. Other operating systems are also feasible. Further, the operating system has been adapted so that the block storage device processor 30 is located within the kernel of the operating system. By establishing the processor 30 within the kernel, the need to perform a separate installation for the processor 30 in the NAS device 14 is avoided. Further, in one embodiment, the operating system, including the processor 30 are stored on one or more of the block data storage devices 26. When needed, the operating system 28 is loaded into memory (not shown) and executed by a processing engine (not shown), such as a microprocessor, associated with the NAS device 14.

With respect to the block data storage devices 26, it should be appreciated that the NAS device 14 can be provided to a customer without the block data storage devices 26 installed so that the customer can install their own devices. However, it is expected that in most situations, the NAS device 14 will be provided to customers with the block data storage devices 26 installed.

The NAS device 14 also includes a data buffer 32 that facilitates network performance by allowing data transfers to take place over the network infrastructure 18 even though the particular block data storage device in the NAS device 14 is not in a condition to process the data transfer. For example, if the block data device is not capable of processing a "write" network command from the host computer 16, the data for the "write" command can be stored in the buffer 32 and transferred to the block data storage device at a later time.

The host computer 16 comprises a host network interface 36 for transmitting/receiving communications to/from the network infrastructure 18 according to a packet protocol (e.g. TCP/IP). Consequently, the interface 36 is capable of packetizing communications that are to be transmitted over the network infrastructure 18 and recombining related packets that are received from the network infrastructure 18. Also comprising the host computer 16 is an application program 38 that, when being executed, is at least partially loaded into the memory (not shown) of the host computer 16 and being executed by a processing engine (not shown) associated with the host computer 16.

Also comprising the host computer 16 is a host operating system 40 for, among other things, processing requests from the application program 38. The host operating system 40, when being executed, is at least partially loaded into the memory (not shown) of the host computer 16 and executed by a processing engine (not shown) associated with the host computer 16. The host operating system 40 comprises a host remote block storage device processor 42 that is specifically adapted to handle requests from the application program 38 that involve the block data storage devices 26 associated with the NAS device 14. For illustration purposes, the block data storage devices 26 are represented within the host computer 16 as "virtual" block data storage devices 26'. Specifically, the host operating system 40 with the host remote block storage device processor 42 operates to: (1) receive requests from an application program that relate to the reading or writing of data to a file located on one of the block data storage devices 26, i.e., a file request; (2) translate the file request into one or more network commands; (3) cause a network command to be conveyed to the host network interface 36; (4) receive a response to a previously conveyed network command from the host network interface; and (5) transmit, if appropriate, the response to the application program.

As exemplary of a typical host computer, the host computer 16 further comprises a one or more storage devices 44 that are managed by storage controllers 46. The storage devices 44, in contrast to the block data storage devices 26, are consider "local" to the host computer 16. A buss 48, which in the illustrated embodiment is a PCI buss, provides a communication path between the host operating system 40 and the storage controllers 46. Typically, the application program 38 and operating system 40 are each stored on one or more of the storage devices 44 when not being executed. When the application program 38 and operating system 40 are executing, at least a portion of each is loaded from the one or more storage devices 44 into the memory (not shown) of the host computer 16.

The host computer 16 also includes a data buffer 49 that facilitates network performance by allowing data transfers to take place over the network infrastructure 18 even though the application program 38 is not in a condition to process the data transfer. For example, if the application program 38 is not capable of processing the response to a "read" network command, the data can be stored in the data buffer 49 and transferred to the application program 38 at a later time. A data buffer 50 is also associated with the application program 38 to facilitate network performance by providing additional or alternative data storage capacity that can be utilized to store data when other elements within the network 10 are not in a condition to accept a data transfer.

The network infrastructure 16 is any network infrastructure or any combination of network infrastructures. For instance, the network infrastructure 16 can be implemented in the form of a LAN or WAN. In addition, the network infrastructure can include the Internet. At the physical level, the network infrastructure can be implemented according to the Ethernet standard. The network infrastructure can also be implemented according to other standards. Further, communications over the infrastructure 16 are conducted according to a packet protocol, such as TCP/IP (which is predominantly used on the Internet), Novel, Aplletalk and Streaming Control Transmission Protocol (SCTP). SCTP is particularly useful in reducing latency in congested networks. Communications according to other packet protocols are also feasible.

Generally, the host operating system 40 with host remote block storage device processor 42 is capable of receiving a file command that has been output by an application program executing in the host system and translating the file command into one or more network commands that are sent over the network infrastructure to the NAS device 14 according to a packet protocol and then applied to one of the block data storage devices 26. The minimal network command set depends upon the character of block data storage devices 26. If the block data storage devices 26 are read-only devices, the minimal network command set is a read command. If the block data storage devices 26 are read/write devices, the minimal network command set has a read command and a write command. The network command set will typically include commands that do not directly relate to the reading or writing of data onto a block data storage device but that facilitate the transfers of data between the host computer 16 and the NAS device 14. In any event, a network command set must include the minimal command set.

With reference to FIGS. 3–9C, a network command set for the host remote block storage device processor 42 is described. The network command set includes a read block (s) command and a write block(s) command, which are generic or interface independent relative to all block data storage devices or a subset of the complete command set of any single block data storage device. In the illustrated embodiment, the network command set further includes commands that relate to the connection between the NAS device 14 and the host computer 16. As such, these commands are neither generic to block data storage devices nor a subset of the complete command set for a single block data storage device. In the illustrated embodiment, these commands include a "ping" command for use in assessing network latencies and a disconnect command for terminating the socket connection between the host computer 16 and the NAS device 14.

The host remote block storage device processor 42 implements each network command in the form of a "request." The request can take several forms depending on the circumstances. In the illustrated embodiment, the request is capable of including one or more sub-commands. For instance, a read request or read network command includes one or more read sub-commands that each relate to a block of data or contiguous blocks of data. A request can also be implemented such that there are no sub-commands. For instance, a read request or read network command would relate to a single block of data or contiguous blocks of data. In such an implementation, multiple read requests would be needed to achieve the same effect as a read request that allows for multiple read sub-commands. A request can also be implemented such that, in the case of read and write network commands, the request only relates to a single block of data. In this particular case, many more read or write requests would be needed relative to an implementation that allows for sub-commands where each sub-command is capable of relating to a block of data or contiguous blocks of data.

Figure 2:
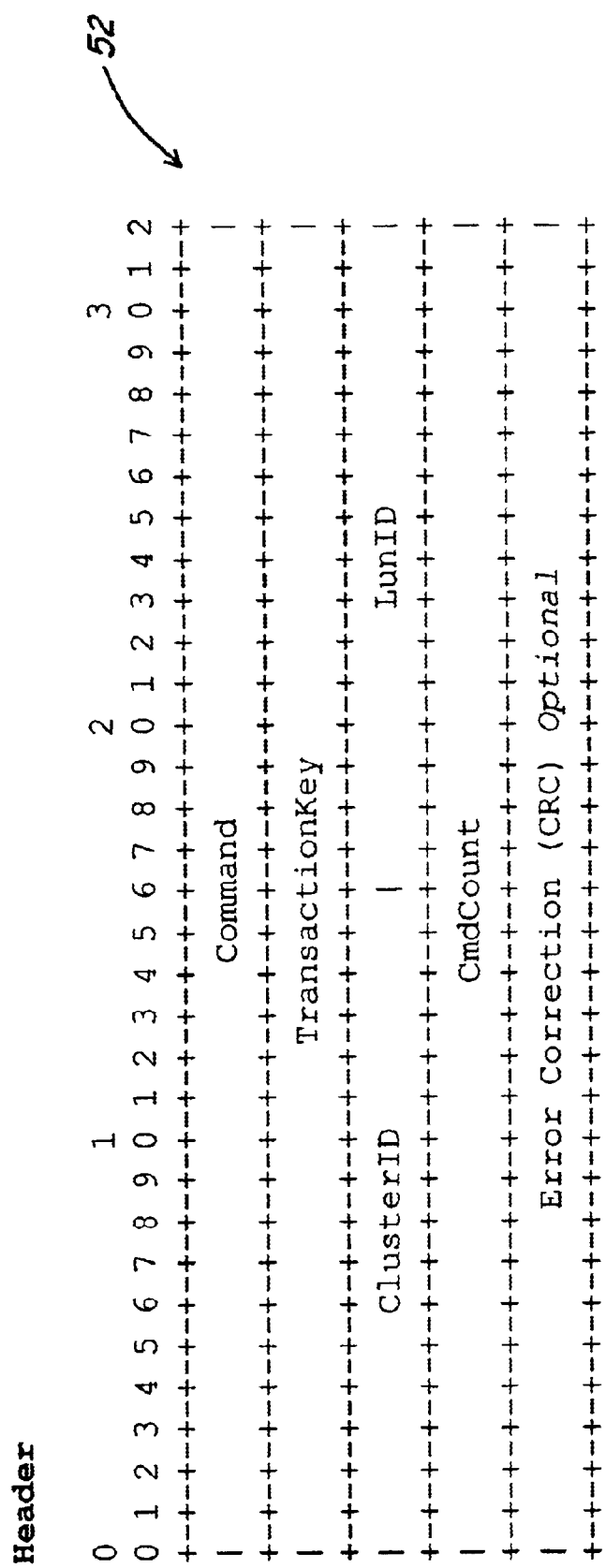
FIG. 2 illustrates the header of a "request"

With reference to FIG. 2, a request is identified by a header 52. The header includes the following fields: (1) a command field for holding a network command code; (2) TransactionKey field for holding a key that is unique to the request for the duration of a session (i.e., during a valid connection between the NAS device 14 and the host computer 16); (3) ClusterID field for holding a unique identifier for a cluster of storage devices/device associated with the NAS device 14 that are/is capable of functioning as a single resource; (4) LunID field for holding a unique identifier that, in the context of a cluster, refers to a logical partition or volume within the cluster; (5) CmdCount field for holding the total number of commands represented within the request; and (6) Error Correction CRC field for holding an error correction cyclic redundancy check if the "C" field is equal to 1 in the identify network command, which is described hereinafter.

With reference to FIGS. 3A–3B, the identify network command is described. The identify network command is used by the host computer 16 to request information from and/or send information to the NAS device 14. It is anticipated that the identify network command will be sent immediately after a connection is established between the host computer 16 and the NAS device 14, i.e., at the start of a session. The host remote block storage device processor 42 operates to establish a "request" that only includes the identify network command. The header portion of the identify network command includes a command field with a value of 0x02. Also included in the header portion are transaction key, cluster id and lun id fields. The command count field in the identify network command is set to 0x01, which reflects that the request includes the identify network command and no sub-commands. In addition to the header portion, the identify network command includes a C field, ECCT field, and Version field. The C field is an ECC flag. If the C field has a value of 0, no ECC is present. A C field with a value of 1 indicates that ECC is present. The ECCT field indicates the type of error correction algorithm that will be employed when the C field is set to 1. The Version field identifies the version of the software being used in processing the network commands. The NAS device 14 utilizes the information in the Version field to verify that it is using the same version of software as the host computer 16.

With reference to FIG. 3B, the acknowledgment that is transmitted by the NAS device 14 and received by the host remote block storage device processor 42 in response to the identify network command includes the header, which has the same command, transaction key, clusterid and lunid fields and values within each of the fields as the identify network command or identify request. The acknowledgment further includes the following fields and values within the fields that provide the processor 42 with information that is used in generating subsequent network commands or requests: (1) BlkSize field for specifying the minimum block size with respect to the specified cluster and lun; (2) MaxLBA field for specifying the maximum logical block address represented by the specified cluster and lun; (3) PreferredBlkSize field for specifying the preferred block size from the perspective of the NAS device 14 for the specified cluster and lun; (4) MaxCmdsPerRqst field for specifying the maximum number of sub-commands per request; (5) MaxBlksPerCmd field for specifying the maximum number of blocks that can be associated with a read or write sub-command; (6) Serial Number field for holding the serial number in ASCII for the lun identified within the LunID field and the cluster identified in the ClusterID field; (7) Device Number field for specifying the device ID in ASCII with which the lun identified in the LunID field is associated; and (8) a second Version Number for specifying the version number of software and/or hardware that may be used in conjunction with the software that is used in processing the network commands.

With reference to FIGS. 4A–4B, the read network command is described. The read network command is used by the host computer 16 to obtain one or more blocks of data resident on a block data storage device 26 within the NAS device 14. The read network command includes one or more read sub-commands that each relate to a block of data or contiguous blocks of data. The header portion of the read network command includes a command field with a value of 0x10. Also included with the header portion are transaction key, cluster id and lun id fields. The command count field holds a value that reflects the number of read sub-commands within the read network command. In addition to the header portion, the read network command includes at least one read sub-command that is comprised of StartLBA, BlkCount and Status/Type fields. The StartLBA field is used to specify the starting logical block address, with respect to the identified cluster id/lun id, at which the read operation is to commence. The BlkCount field is used to specify the number of blocks that are to be read beginning at the start logical block address specified in the StartLBA field. The Status/Type field is used to specify that there is "no error" in the read sub-command.

With respect to FIG. 4B, the acknowledgment that is received by the host computer 16 and, in particular, the host remote block storage device processor 42 in response to a previously sent read network command or read request is described. The acknowledgment includes a header portion that is identical to the header portion in the read network command. The acknowledgment also includes, for each read sub-command in the read network command, the StartLBA and BlkCount fields with the values that were in the read network command. The Status/Type field holds a value that indicates whether or not there was an error in reading the data from the block data storage device. Further, if there was an error, the value in the field provides an indication of the type of error that was encountered. The acknowledgment also includes a data field with the requested data from a block data storage device 26 within the NAS device 14. If the C field in a previously sent identify network command is set to "1" to enable error correction coding, the acknowledgment also includes an ECC field that holds an error correction code for the data in the data field.

With reference to FIGS. 5A–5B, the write network command is described. The write network command or write request is used by the host computer 16 to write one or more blocks of data to a block data storage device 26 within the NAS device 14. The write network command includes one or more write sub-commands that each relate to a block of data or contiguous blocks of data. The header portion of the write network command includes a command field with a value of 0x20. The header portion further includes transaction key, cluster id and lun id fields. The command count field holds a value that reflects the number of write sub-commands within the write network command. In addition to the header portion, the write network command includes at least one write sub-command that is comprised of StartLBA, BlkCount and Status/Type fields. The StartLBA field is used to specify the starting logical block address, with respect to the identified cluster id/lun id, at which the write operation is to commence. The BlkCount field is used to specify the number of blocks that are to be written beginning at the start logical block address specified in the StartLBA field. The Status/Type field is used to specify that there is "no error" in the write sub-command. The write network command further includes a data field that holds the data that is to be written on one of the block data storage devices 26 in the NAS device 14 according to the values set forth in the cluster id, lun id and StartLBA fields. Further, the write network command includes, if the C field in a previously sent identify network command is set to "1", an error correction code field that contains a error correction code for the data set forth in the data field.

With reference to FIG. 5B, the acknowledgment that is received by the host computer 16 and, in particular, the host remote block storage device processor 42 in response to a previously sent write network command or write request is described. The acknowledgment is generated by the NAS device 14 and sent to the host computer 16 after the operating system 28 within the NAS device 14 is aware that the data has been received and is ready to be written to one of the block data storage devices 26. Consequently, the acknowledgment may be sent to the host computer 16 before the data is actually written to the physical device, i.e., one of the block data storage devices 26. The acknowledgment includes a header portion that has the same fields and values in the fields as the header portion in the write network command. The acknowledgment also includes, for each write sub-command in the write network command, the StartLBA and BlkCount fields with the values that were in the write network command. The Status/Type field holds a value that indicates whether or not there was an error in writing the data to the block data storage device. Further, if there was an error, the value in the field provides an indication of the type of error that was encountered. The acknowledgment does not, however, include the data that was in the data field(s) of the write network command.

With reference to FIGS. 6A–6B, the write/now network command is described. Generally, the write/now network command serves the same purpose as the write network command. Namely, the write/now network command is used by the host computer 16 to write blocks of data to a block data storage device 26 within the NAS device 14. The difference between the write/now network command and the write network command lies in the timing of the acknowledgement. The NAS device 14, as previously described, generates and sends the acknowledgment once the operating system 28 is aware that data is available to be written to one of the block data storage devices 26. Consequently, the acknowledgment may be sent before the data is ever written to one of the block data storage devices 26. In contrast, the NAS device 14 does not generate and send an acknowledgment with respect to a write/now network command until after the data is actually written to a physical device, i.e., one of the block data storage devices 26.

With reference to FIGS. 6A–6B, the write/now network command includes a header portion has a command field with a value of 0x20. Also included within the header portion are transaction key, cluster id and lun id fields. The command count field holds a value that reflects the number of write sub-commands within the write/now network command. In addition to the header portion, the write network command includes at least one write sub-command that is comprised of StartLBA, BlkCount and Status/Type fields. The StartLBA is used to specify the starting logical block address, with respect to the identified cluster id/lun id, at which the write operation is to commence. The BlkCount field is used to specify the number of blocks that are to be written beginning at the start logical block address specified in the StartLBA field. The Status/Type field is used to specify that there is "no error" in the write sub-command. The write network command further includes a data field that holds the data that is to be written on one of the block data storage devices 26 in the NAS device 14 according to the values set forth in the cluster id, lun id and StartLBA fields. Further, the write network command includes, if the C field in a previously sent identify network command is set to "1", an error correction code field that contains a error correction code for the data set forth in the data field.

With reference to FIG. 6B, the acknowledgment that is received by the host computer 16 and, in particular, the host remote block storage device processor 42 in response to a previously sent write/now network command is described. The acknowledgment is generated by the NAS device 14 and sent to the host computer 16 after the data has actually been written to one or more of the block data storage devices 26. The acknowledgment includes a header portion that has the same fields and values in the fields as the header portion in the write/now network command. The acknowledgment also includes, for each write sub-command in the write network command, the StartLBA and BlkCount fields with the same values that were in the write network command. The Status/Type field holds a value that indicates whether or not there was an error in writing the data to the block data storage device. Further, if there was an error, the value in the field provides an indication of the type of error that was encountered. The acknowledgment does not, however, include the data that was in the data field(s) of the write network command.

With reference to FIGS. 7A–7B, the disconnect network command or disconnect request is described. The disconnect network command is used by the host computer 16 to terminate the socket connection with the NAS device 14. The disconnect network command, unlike the other network commands, can also be sent by the NAS device 14 to the host computer 16 to terminate the connection. If the host computer 16 sends the disconnect network command the NAS device 14 responds by processing any outstanding read and/or write operations, sends the acknowledgment, and then terminates the connection. If the NAS device 14 sends the disconnect network command to the host computer 16, the host computer 16 assumes that any outstanding and unacknowledged read or write network commands are irretrievably lost.

With reference to FIG. 7A, the disconnect network command or disconnect request includes a header portion that has a command field with a value of 0x41. The header portion also includes transaction key, cluster id and lun id fields. The command count field holds a value of 0x01, reflecting that the disconnect network command or request includes the disconnect network command and no sub-commands.

With reference to FIG. 7B, the acknowledgment that is generated by the recipient of the disconnect network command and provided to the initiator of the disconnect network command is described. The acknowledgment includes fields that are identical to the field in the disconnect network command. The values in the fields of the acknowledgment are identical to the values in the fields of the disconnect network command.

With reference to FIGS. 8A–8C, the "ping" network command or ping request is described. The ping network command is used by the host computer 16 to determine latencies within the network. The ping network command, like the disconnect network command, can also be issued by the NAS device 14. To determine latencies in the network, it is assumed that both the NAS device 14 and the host computer 16 are synchronized, i.e., their internal system clocks are synchronized. Typically, synchronization is achieved on boot up of the network using a network time protocol, which is commonly referred to by the acronym NTP.

With reference to FIG. 8A, the ping network command includes a header portion that has a command field with a value of 0x01. The header portion further include transaction key, cluster id and lun id fields. The command count field holds a value of 0x01, reflecting that the ping network command is a request that includes the ping network command and no sub-commands. The ping network command further includes a "t0" field for holding a value that reflects the time at which the initiator (i.e., the host computer 16 or the NAS device 14) sent the ping network command, as shown on the initiator's internal system clock.

With reference to FIG. 8B, the acknowledgment of the ping network command includes a header portion that includes the same fields and the same values in the fields as the ping network command. Specifically, the acknowledgment includes the command field, transaction key, cluster id, lun id, command count and t0 fields with each field containing the same value as was in the ping network command. In addition, the acknowledgment includes t1 and t2 fields. The t1 fields contains the time that the ping network command was received by the recipient, as shown on the recipient's internal system clock. The t2 fields contains the time that the acknowledgment was sent by the recipient to the initiator, as shown on the recipient's internal system clock.

With reference to FIG. 8C, the complete response to the ping network command includes a header portion that includes the same fields and the same values in the fields as the acknowledgment of the ping network command. Specifically, the complete response includes the command field, transaction key, cluster id, lun id, command count, t0, t1 and t2 fields with each field containing the value that was present in the corresponding field of the acknowledgment. The complete response further includes a t3 field for holding the time that the initiator received the acknowledgment from the recipient, as shown on the initiator's internal system clock.

The values in the t0, t1, t2 and t3 fields are used by the initiator to determine certain information that is representative of the latencies between the initiator and the recipient. Specifically, the round trip time or latency is the value in the t3 field less the value in the t0 field; the upload time or latency is the value in the t1 field less the value in the t0 field; and the download time or latency is the value in the t3 field less the value in the t2 field. These values are used, if desired, by the operating system 28 in the NAS device 14 and/or the operating system 40 in the host device 16 to manage the transfer of data. Specifically, the host operating system 40 can use the upload, download and/or round trip time to determine, among other things, latencies, whether the NAS device 14 is "alive", and timeout limits for data transfers.

Figure 9:
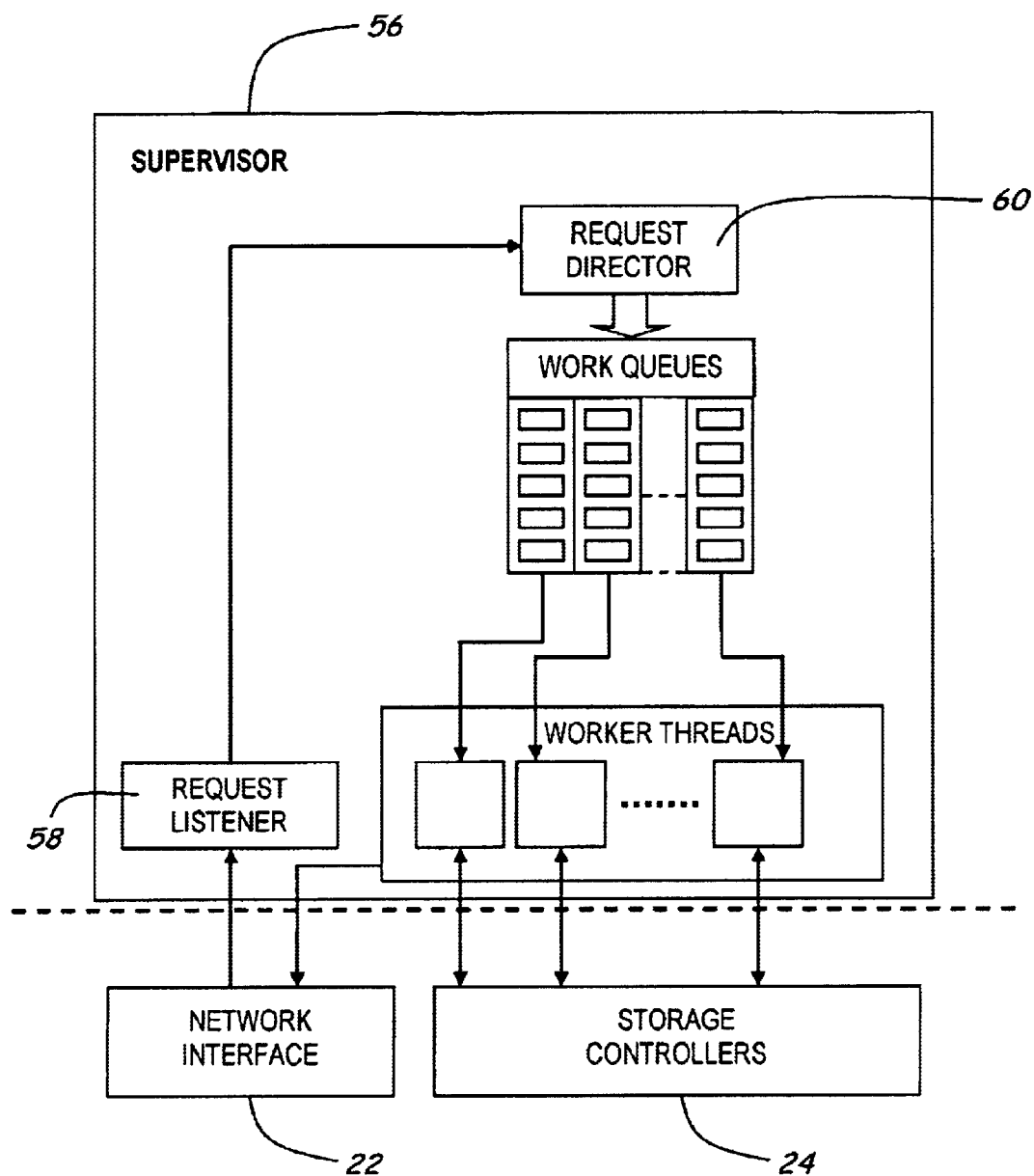
FIG. 9 illustrates one embodiment of the block storage device processor portion of an operating system within a NAS device.

An embodiment of the block storage device processor 30 is described with reference to FIG. 9. The processor 30 generally comprises a supervisor 56, a request listener 58, and a request director 60. The supervisor 56 operates to: (1) start the request listener 58; (2) start the request director 60; and (3) set up work queue(s) and work thread(s) for processing the requests or network commands, with the queue(s) and thread(s) set up according to a configuration file (not shown).

A work queue is a structure for holding the network requests or commands. A work thread processes the network requests or commands in a queue. Processing of a read or write sub-command of a read or write network command and an identify network command involves, for the physical device associated with the values in the cluster id and lun id fields of the header portion of the request, generating the device specific commands that are needed to carry out the command and processing any responses from the physical devices to the specific device commands. With respect to the generation of device specific commands, the thread generates a string of one or more device specific commands that are needed to implement command. For example, to implement a read network command when the physical device is a disk drive, a thread may issue device specific commands that: (1) obtain the status of the drive; (2) if the drive is available, reserve the drive relative to other threads that may want access to the drive; (3) cause the actuator within the drive to move a read/write head to the track at which the starting logical block address is located; and (4) once at the correct track, cause the specified number of blocks to be read from the drive beginning at the specified starting address. Processing of any responses from the physical device with respect to the specific device command involves, in the case of a read network command, providing the requested data in an acknowledgment for transport over the network infrastructure to the host computer 16. In the case of a write network command, the processing involves the generation of an acknowledgment for transport over the network infrastructure to the host computer 16. In the particular case of a write/now network command, the acknowledgment is provided only after the data has been actually written to the physical device. In the case of a identify network command, which possibly involves the generation of device specific commands, processing involves the generation of an acknowledgment Processing of responses also involves the handling of any error conditions that may occur in response to a specific device command. The thread is at least capable of at least providing a error response that is conveyed to the initiating device. In another embodiment, the thread endeavors to recover from the error condition by issuing another device specific command. For instance, the thread may simply retry the device specific command one or more times.

The request listener 58 serves to: (1) accept connections from other elements in the network (which in the illustrated embodiment would only be the host computer 16); and (2) convey requests received from other elements in the network to the request director for processing.

The request director 60 operates to: (1) receive requests or network commands from the request listener 58; (2) separate the sub-commands within a read/write request or network command; and (3) write network commands and sub-commands to a work queue for processing by a work thread. Typically, the supervisor 56 sets up more than one work queue and more than one work thread. In this case, the assignment of a command to a work queue for processing is based upon an assessment by the request director of the work load being currently experienced by each of the work threads. Further, if the request or network command is a disconnect network command, the director 60 prevents any further loading of work queues and causes, upon completion of all queued commands by the work thread or threads, an acknowledgment to be generated. The director 60 also causes an acknowledgment to be generated in response to a ping network command.

With reference to FIG. 1, the transfer of block data between the host computer 16 and the NAS device 14 is described. Generally, the host remote block storage device processor 42 and other parts of the host operating system 40 operate so as to receive file commands from an application program being executed within the host computer 16, convert the file commands into one or more read/write network commands, and provide any such network commands to the network interface card 36 for conveyance over the network infrastructure 18 to the NAS device 14 according to a packet protocol. Generally, the block storage device processor 30 within the NAS device 14 responds to any read/write network command by issuing, via the block storage device interface 24, one or more device specific commands to one of the block data storage devices 26. Additionally, the NAS device 14 causes an acknowledgment of the read/write network command to be conveyed to the host computer 16 via the storage device network interface 22 and network infrastructure 18 according to a packet protocol (e.g. TCP/IP). Generally, the host computer 16 operates so that the acknowledgment is conveyed, after any recombination of packets by the host network interface 36, from the host network interface 36 to the host remote block storage device processor 42. The host remote block storage device processor 42 and other parts of the host operating system 40 cooperate to process the acknowledgment of the previously issued read/write network command. In the case of a read network command, the processor 42 and other parts of the host operating system 40 cooperate to provide the data that was read from one of the block data storage devices 26 and embodied in the acknowledgment to the application that requested the data in the form of a read file command. In the case of a write network command, the processor 42 and other parts of the host operating system 40 typically cooperate to provide the application program with an indication that the data that the application program, in the form of a file command, had requested to be written to storage has been written to a storage device.

As an example of the transfer of block data between the host computer 16 and the NAS device 14 in the context of the particular embodiment of network commands set forth in FIGS. 3–9, the transfer of a block data resident on one of the block data storage devices 26 that is part of the NAS device 14 to an application executing in the host computer 16 is described. Typically, before issuing a read network command, the host remote block storage device processor 42 determines the information particular to the device that is needed to format or desirable in formatting any read network commands by issuing an identify network command. The identify network command is conveyed to the block storage device processor 30 via the host network interface 36, network infrastructure 18, and storage device network interface 22 pursuant to a packet protocol. In response, the block storage device processor 30 may issue device specific commands to the physical device to determine the information needed for the acknowledgment. In any event, the block storage device processor 30 generates the acknowledgment and determines the values for the various field in the acknowledgment. The processor 30 also provides the acknowledgment to be storage device network interface 22 for conveyance to the host computer 16 via the network infrastructure 18.

Once the host remote block storage device processor 42 has determined the information needed or desirable to appropriately format a read network command for one of the block data storage device 26 has been obtained, the processor 42 is able to generate a read network command in response to a read file request from an application program executing on the host computer 16. To elaborate, the host operating system 40 receives a read file command (e.g., read file "xyz") from the application 38, where the file "xyz" is located on one of the block data storage devices 26. The processor 42, in cooperation with other parts of the host operating system 40, translates the read file command into one or more read network commands depending upon the information provided in the acknowledgment to the identify network command. The read network command or commands are conveyed to the NAS device 14 via the host network interface 36 and the network infrastructure 18 according a packet protocol. The block storage device processor 30 processes the read network command or commands by issuing the appropriate device specific commands to the one of the block storage device 26 to cause the required data to be read. Once the data has been read from the device for a read network command, the processor 30 places the data in an acknowledgment and provides the acknowledgment to the storage device network interface 22 for conveyance to the host computer 16 via the network infrastructure and according to a packet protocol.

The host network interface 36 receives the acknowledgment to the read network command and, after any recombination of packets, provides the acknowledgment to the host remote block storage device processor 42. In response, the processor 42 and other parts of the host operating system 40 cooperate to provide the data in the acknowledgment to the application that issued the read file command that caused the issuance of the read network command or commands.

Figure 10:
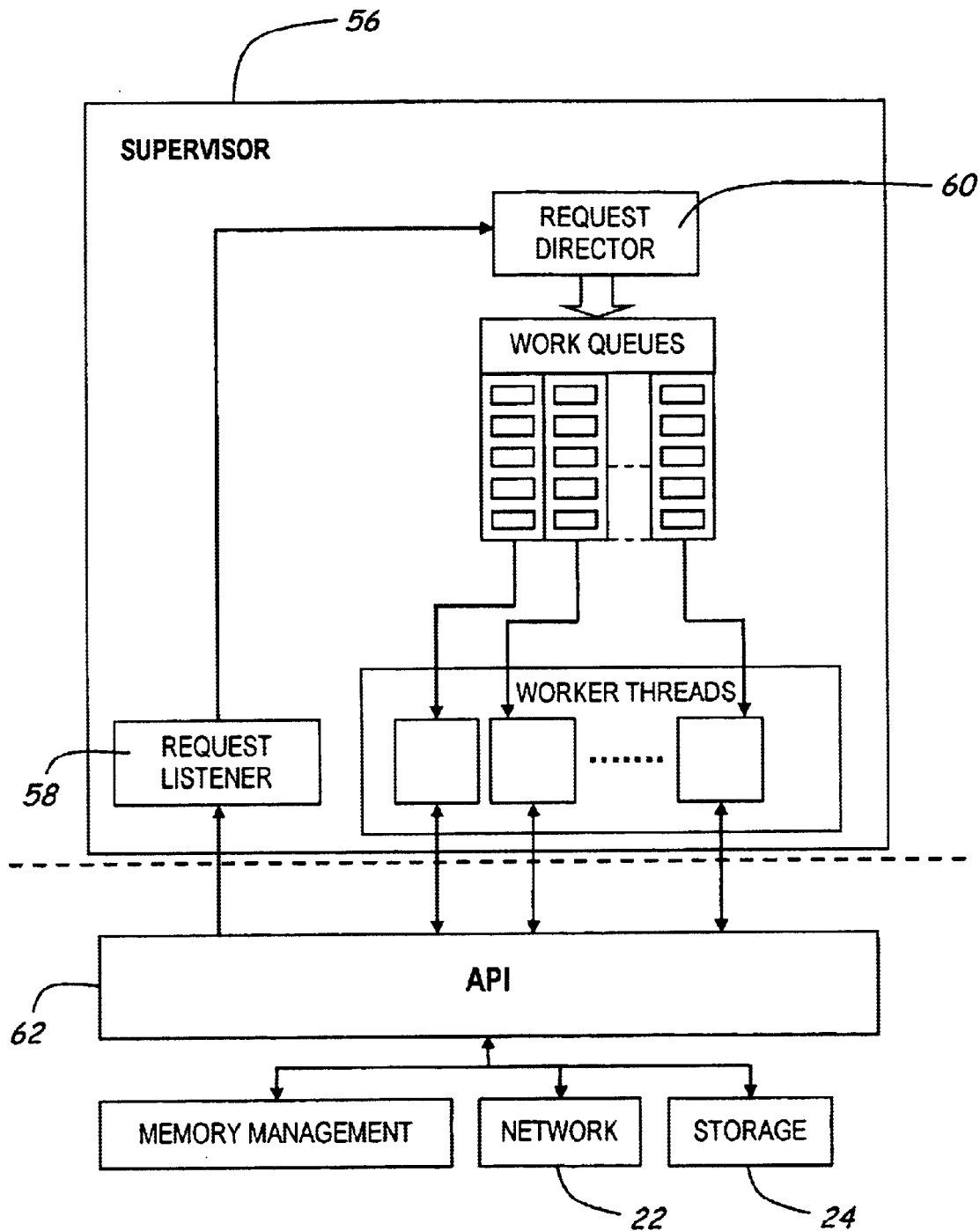
FIG. 10 illustrates a block data storage processor and application program interface for use with the processor.
Figure 11:
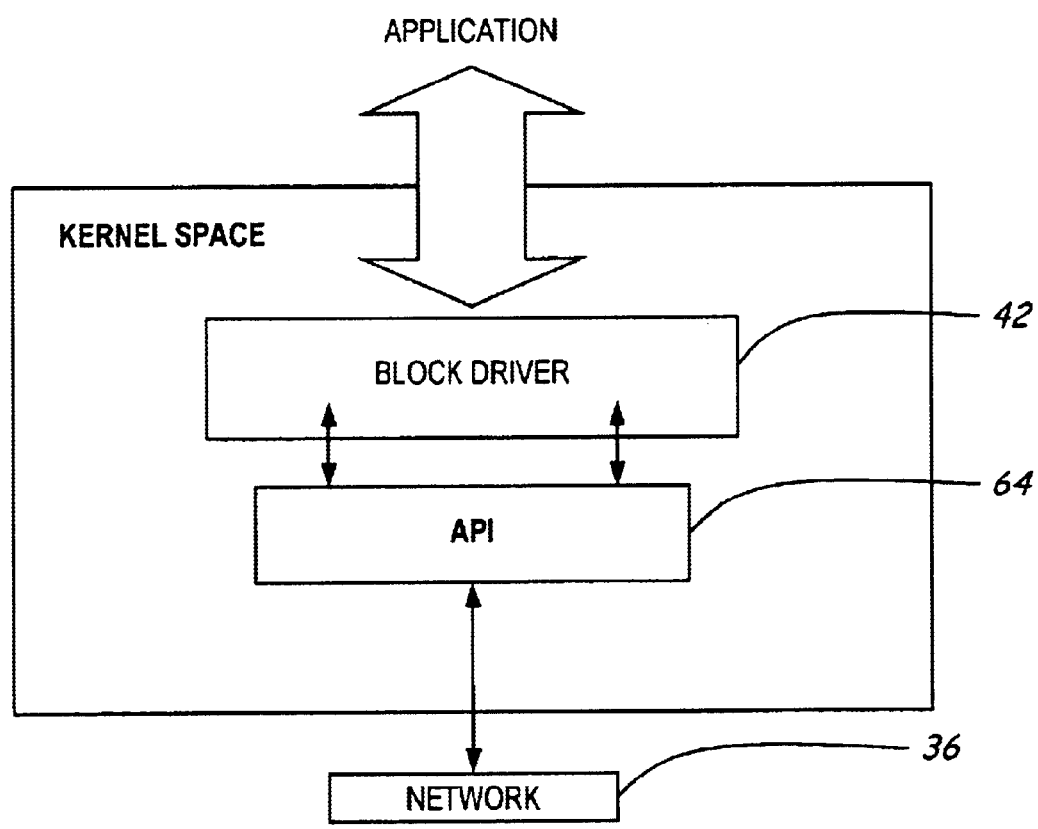
FIG. 11 illustrates a host remote block storage device processor and application program interface for use with the processor.

With reference to FIGS. 10 and 11, an embodiment of the block storage device processor 30 with an application program interface (API) 62 and an embodiment of a host remote block storage device processor 42 with an API 64 are discussed. The API 62 and API 64 each serve to insulate the layers of software associated with the processors from having to address or be adapted to address the manner in which memory and/or the storage devices are implemented in the network 10. The APIs 62 and 64 further provides application programmers with a command interface that allows the programmers to optimize the transfers of block data for a particular application. For instance, in an application that involves streaming video, the API provides the programmer of the application with the ability to optimize the transfer of block data within the network to implement the streaming video application. In one implementation, the APIs 62 and 64 provide the ability to implement network functions, device functions and memory functions.

Network functions implement a telephone-like model in which calls are placed and calls are answered to establish a connection. The NAS device 14 side utilizes a netListen network function to listen for connection requests from the host 16; the host 16 side of the process utilizes a netCall network function to submit a connection request; and the NAS device 14 side of the process utilizes a netAnswer network function to accept the connection request, i.e., direct the establishment of a connection between the NAS device 14 and the host 16. Once a connection is established, netRead and netWrite network functions are utilized to effect the transfer of data over the connection. Other network functions are also feasible.

The NAS device 14 side utilizes devRead and devWrite device functions respectively to read block of data from a device and write blocks of data to block data storage device. Other device functions include: (a) devOpen for opening a block data storage device for reading/writing; (b) devClose for closing a device to allow a block data storage device to be accessed by other processes; and (c) devStatus for obtaining the current status of a block data storage device (e.g., available, unavailable, reserved etc.). Other device functions are also feasible.

The memory functions provide for the allocation and de-allocation of memory on both the NAS device 14 side and the host computer 16 side.

The embodiment described hereinabove is further intended to explain the best mode known of practicing the invention and to enable others skilled in the art to utilize the invention.

What is claimed is:

1. A computer structure comprising:
a host computer that is remotely located relative to a network attached storage device and comprising:
   a host network interface for transmitting/receiving communications to/from a network infrastructure according to a packet protocol;
   a host operating system with a host block storage device processor that is capable of:
      receiving, from an application executing on a host computer, a file command;
      translating a file command into a network command of a set of network commands that is interface independent relative to block data storage devices, said set of network commands including a read command for use in causing at least one block of data stored on a recording medium of a block data storage device to be read, said read command including a unique block address within the block data storage device;
      transmitting said network command to said host network interface for conveyance over a network infrastructure according to a packet protocol;
      receiving a response to a previously transmitted network command from said host network interface; and
      transmitting, if appropriate, said response to the application as at least a partial reply to the file command.

2. A computer structure, as claimed in claim 1, further comprising:
a network attached storage device comprising:
   a storage device network interface capable of transmitting/receiving communications to/from a network infrastructure according to a packet protocol;
   a block storage device interface capable of transmitting/receiving communications to/from a block data storage device;
   a storage device operating system with a block storage device processor that is capable of:
      receiving, from said storage device network interface, a network command of a set of network commands that is interface independent relative to block data storage devices;
      generating, to carry out said network command, one or more device specific commands for a block data storage device;
      transmitting each of said one or more device specific commands to said block storage device interface;
      receiving, from said block storage device interface, a response to said one or more device specific commands that satisfies the network command; and
      transmitting, to said storage device network interface, said response to said network command.

3. A network structure, as claimed in claim 1 or 2, further comprising:
a network infrastructure operatively connected to said storage device network interface and said host network interface, wherein said network infrastructure is capable of operating according to a packet protocol.

4. A computer structure comprising:
a network attached storage device comprising:
   a storage device network interface capable of transmitting/receiving communications to/from a network infrastructure according to a packet protocol;
   a block storage device interface capable of transmitting/receiving communications to/from a block data storage device;
   a storage device operating system with a block storage device processor that is capable of:
      receiving, from said storage device network interface, a network command of a set of network commands that is interface independent relative to block data storage devices;
      generating, to carry out said network command, one or more device specific commands for a block data storage device;
      transmitting each of said one or more device specific commands to said block storage device interface;
      receiving, from said block storage device interface, a response to said one or more device specific commands that satisfies the network command; and
      transmitting, to said storage device network interface, said response to said network command;
a host computer with respect to which said network attached storage device is considered remote, said host computer comprising:
   a host network interface for transmitting/receiving communications to/from a network infrastructure according to a packet protocol;
   a host operating system with a host block storage device processor that is capable of:
      receiving, from an application executing on a host computer, a file command;
      translating a file command into a network command of a set of network commands that is interface independent relative to block data storage devices, said set of network commands including a read command for use in causing at least one block of data stored on a recording medium of a block data storage device to be read, said read command including a unique block address within the block data storage device;
      transmitting said network command to said host network interface for conveyance over a network infrastructure according to a packet protocol;
      receiving a response to a previously transmitted network command from said host network interface; and
      transmitting, if appropriate, said response to the application as at least a partial reply to the file command.

5. A network structure, as claimed in claim 4, further comprising:
a network infrastructure operatively connected to said storage device network interface and said host network interface, wherein said network infrastructure is capable of operating according to a packet protocol.

6. A computer structure for use in the storage of blocks of data comprising:
a network attached storage device comprising:
   a storage device network interface capable of transmitting/receiving communications to/from a network infrastructure according to a packet protocol;
   a block storage device interface capable of transmitting/receiving communications to/from a block data storage device;
   a storage device operating system with a block storage device processor that is capable of:
      receiving, from said storage device network interface, a network command of a set of network commands that is interface independent relative to block data storage devices, said set of network commands including a read command for use in causing at least one block of data stored on a recording medium of a block data storage device to be read, said read command including a unique block address within the block data storage device;

generating, to carry out said network command, one or more device specific commands for a block data storage device;

transmitting each of said one or more device specific commands to said block storage device interface;

receiving, from said block storage device interface, a response to said one or more device specific commands that satisfies the network command; and transmitting, to said storage device network interface, said response to said network command; and a memory comprising:
a host operating system with a host block storage device processor for implementing in a host computer relative to which said network attached storage device would be remote, wherein said host operating system with a host block storage device processor is capable of:
receiving, from an application executing on a host computer, a file command;
translating a file command into a network command of a set of network commands that is interface independent relative to block data storage devices;
transmitting said network command to a network interface associated with the host computer for conveyance over a network infrastructure according to a packet protocol;
receiving a response to a previously transmitted network command from the network interface; and
transmitting, if appropriate, the response to the application as at least a partial reply to the file command.

7. A computer structure for use in the storage of blocks of data comprising:
a network attached storage device comprising:
a storage device network interface capable of transmitting/receiving communications to/from a network infrastructure according to a packet protocol;
a block storage device interface capable of transmitting/receiving communications to/from a block data storage device;
a storage device operating system with a block storage device processor that is capable of:
receiving, from said storage device network interface, a network command of a set of network commands that is interface independent relative to block data storage devices;
generating, to carry out said network command, one or more device specific commands for a block data storage device;
transmitting each of said one or more device specific commands to said block storage device interface;
receiving, from said block storage device interface, a response to said one or more device specific commands that satisfies the network command; and
transmitting, to said storage device network interface, said response to said network command; and a host computer with respect to which said network attached storage device is considered remote, said host computer comprising:
a host network interface for transmitting/receiving communications to/from a network infrastructure according to a packet protocol;
a host operating system with a host block storage device processor that is capable of:
receiving, from an application executing on a host computer, a file command;
translating a file command into a network command of a set of network commands that is interface independent relative to block data storage devices, said set of network commands including a read command for use in causing at least one block of data stored on a recording medium of a block data storage device to be read, said read command including a unique block address within the block data storage device;
transmitting said network command to said host network interface for conveyance over a network infrastructure according to a packet protocol;
receiving a response to a previously transmitted network command from said host network interface; and
transmitting, if appropriate, said response to the application as at least a partial reply to the file command.

8. A computer structure, as claimed in claim 6 or 7, wherein:
said set of network commands includes a read network command and write network command.

9. A computer structure, as claimed in claim 6 or 7, wherein:
said set of network commands includes a command relating to a network connection.

10. A computer structure, as claimed in claim 9, wherein:
said command relating to a network connection includes a disconnect command for severing a network connection.

11. A computer structure, as claim in claim 9 wherein:
said command relating to a network connection includes a ping command for use in determining a network latency.

12. A computer structure, as claimed in claim 6 or 7, wherein:
said storage device operating system with block storage device processor includes a supervisor that capable of setting up a work queue and a work thread.

13. A computer structure, as claimed in claim 6 or 7, wherein:
said storage device operating system with block storage device processor includes a request director.

14. A computer structure, as claimed in claim 6 or 7, wherein:
said storage device operating system with block storage device processor includes a request listener.

15. A network structure, as claimed in claim 6 or 7, further comprising:
a network infrastructure operatively connected to said storage device network interface and said host network interface, wherein said network infrastructure is capable of operating according to a packet protocol.

* * * * *